United States Patent
Bost et al.

(10) Patent No.: US 10,011,526 B2
(45) Date of Patent: Jul. 3, 2018

(54) HYDRAULIC BINDER AND HYDRAULIC COMPOSITION COMPRISING SAME

(71) Applicant: LAFARGE, Paris (FR)

(72) Inventors: Pascal Bost, Saint Quentin Fallavier (FR); Alexander Pisch, Saint Quentin Fallavier (FR); Ellis Gartner, Saint Quentin Fallavier (FR); Vincent Morin, Saint Quentin Fallavier (FR); Isabelle Dubois-Brugger, Saint Quentin Fallavier (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 15/543,636

(22) PCT Filed: Jan. 15, 2016

(86) PCT No.: PCT/FR2016/050075
§ 371 (c)(1),
(2) Date: Jul. 14, 2017

(87) PCT Pub. No.: WO2016/113513
PCT Pub. Date: Jul. 21, 2016

(65) Prior Publication Data
US 2017/0355641 A1 Dec. 14, 2017

(30) Foreign Application Priority Data
Jan. 16, 2015 (FR) .................... 15 50370

(51) Int. Cl.
*C04B 7/345* (2006.01)
*C04B 28/02* (2006.01)
*C04B 28/04* (2006.01)

(52) U.S. Cl.
CPC .......... *C04B 7/3453* (2013.01); *C04B 28/025* (2013.01); *C04B 28/04* (2013.01)

(58) Field of Classification Search
CPC ...... C04B 7/3453; C04B 28/04; C04B 28/025
See application file for complete search history.

(56) References Cited

U.S. PATENT DOCUMENTS

| | | | |
|---|---|---|---|
| 5,509,962 A | 4/1996 | Tang | |
| 7,998,267 B2 * | 8/2011 | Gartner | C04B 28/065 106/692 |
| 8,177,903 B2 * | 5/2012 | Walenta | C04B 28/065 106/692 |
| 8,317,915 B2 * | 11/2012 | Walenta | C04B 7/323 106/692 |
| 8,568,528 B2 * | 10/2013 | Barnes-Davin | C04B 7/323 106/739 |
| 8,852,339 B2 * | 10/2014 | Walenta | C04B 7/323 106/739 |
| 9,409,818 B2 * | 8/2016 | Pasquier | C04B 28/065 |
| 9,434,646 B2 * | 9/2016 | Pasquier | C04B 28/065 |
| 2007/0266903 A1 * | 11/2007 | Gartner | C04B 7/323 106/693 |

FOREIGN PATENT DOCUMENTS

| | | |
|---|---|---|
| EP | 1 260 812 A1 | 11/2002 |
| FR | 2940274 A1 * | 6/2010 |
| JP | 2010-037172 A | 2/2010 |
| WO | WO 2006/032785 A2 | 3/2006 |
| WO | WO 2006/032786 A2 | 3/2006 |
| WO | WO 2010/070215 A1 * | 6/2010 |

OTHER PUBLICATIONS

International Search Report and the Written Opinion of the International Searching Authority as issued in International Patent Application No. PCT/FR2016/050075, dated Apr. 11, 2016.
Preliminary Search Report as issued in French Patent Application No. 1550370, dated Dec. 7, 2015.
Liu, Y., et al., "Active Belite Cement Clinker Produced with Mineral Waste," Advanced Materials Research, vol. 610-613, Dec. 2012, XP55183616, ISSN: 1022-6680, pp. 2378-2385.

* cited by examiner

Primary Examiner — Anthony J Green
(74) Attorney, Agent, or Firm — Pillsbury Winthrop Shaw Pittman LLP

(57) ABSTRACT

A hydraulic binder which includes a clinker with a specific shape, the clinker including as main phases, given as weight percentages relative to the total weight of the clinker: (i) 70 to 95% of a belite phase having a particle size such that the Dv50 ranges from 5 to 15 μm; (ii) 5 to 30% of a calcium aluminoferrite phase; and (iii) less than 5% of minor phases; the clinker having an $Al_2O_3/Fe_2O_3$ weight ratio of less than 1.5; and the clinker including less than 5% of alite phase and less than 5% of calcium sulphoaluminate phase; and at least 0.5% dry weight of an activator made of calcium sulphate, as a weight percentage relative to the total weight of phases (i) to (iii).

9 Claims, No Drawings

HYDRAULIC BINDER AND HYDRAULIC COMPOSITION COMPRISING SAME

CROSS-REFERENCE TO RELATED APPLICATIONS

This application is the U.S. National Stage of International Application Serial No. PCT/FR2016/050075, filed Jan. 15, 2016, which in turn claims priority to French Application No. 1550370, filed Jan. 16, 2015. The contents of all of these applications are incorporated herein by reference in their entirety.

The invention relates to a novel two-phase belite clinker-based hydraulic binder and a hydraulic composition comprising the binder.

Belite clinkers are clinkers having a low alite content or not having alite. Alite is one of the "mineralogical phases" (called "phases" in the following of the description) of the known Portland type clinkers. Alite comprises tricalcium silicate $Ca_3SiO_5$ (which can also be symbolised as C3S or $3(CaO).(SiO_2)$ as explained hereinafter).

The process of manufacturing belite clinkers is such that these clinkers have the advantage to significantly reduce $CO_2$ emissions in comparison with the manufacture of known Portland type clinkers.

Clinkers and hydraulic binders comprising belite are known. However, it is difficult to prepare, from such clinkers or binders, concrete compositions which have, for example, a satisfactory initial setting time, that is sufficiently short to meet user requirements. Additionally, belite is known to be difficult to activate and it is thereby difficult to achieve mechanical strengths by hydrating belite in the short term.

Belite cements are known to be difficult to activate. The properties of such clinkers are altered by the main phases and further minor phases which are present in the clinker, as well as their respective amounts. The properties of these clinkers are also altered by the presence of secondary elements in the clinker and their respective amounts. The interaction between these different factors makes it virtually impossible to predict the properties of a clinker simply from the knowledge of its chemical composition, the phases which are present and the respective amounts of these phases. The easy manufacture of a clinker, the easy grounding of a clinker to obtain a hydraulic binder and the different chemical and mechanical properties of a mortar or a concrete comprising the binder can all be altered.

There are solutions to activate belite, but they all have drawbacks. For example, adding C3S enables the compression strengths to be improved 1 day after mixing. However, this solution does not improve strengths 28 days after mixing. The same behaviour has been noticed with the addition of very fine Portland cement having a Blaine specific surface area of about 9000 $cm^2/g$.

Another example is the addition of C4A3$. This solution enables short term strengths to be improved, but the strengths 28 days after mixing remain relatively moderate, generally in the same order of magnitude as a belite sulpho-aluminous clinker. Both these types of solutions thus are not satisfactory from the point of view of the mechanical strengths achieved.

There are other types of solutions, but which are complex hydrothermal reactions, made batchwise, in pressurised reactors. These solutions thus are not suitable for a continuous industrial production.

There is thus a need for a solution to activate belite, enabling a sufficiently early initial setting time, satisfactory mechanical strengths in the short and long term to be achieved, and which is suitable for a continuous industrial production. The present invention seeks to solve this technical problem.

The present invention seeks to provide a binder comprising a clinker comprising belite enabling a mortar and a concrete to be prepared, which have improved properties, such as the setting time or compression strength, in comparison with known Portland type or belite sulpho-aluminous binders.

The present invention provides a binder comprising a clinker comprising as main phases, in % expressed in mass relative to the total mass of the clinker:
  (i) from 70 to 95% of a belite phase having a particle size such that Dv50 ranges from 5 to 15 μm;
  (ii) from 5 to 30% of a calcium alumino-ferrite phase; and
  (iii) less than 5% of minor phases;
  the clinker having an $Al_2O_3/Fe_2O_3$ mass ratio lower than 1.5; and
  the clinker comprising less than 5% of alite phase and less than 5% of calcium sulpho-aluminate phase.

The clinker according to the present invention is a two-phase clinker, because it comprises two major main phases: belite and calcium alumino-ferrite.

The total of the percents of phases (i) to (iii) is preferably higher than or equal to 90%, more preferentially higher than or equal to 95%.

The chemical formulae in the field of hydraulic binders are often expressed as sums of the oxides they contain: thus, tricalcium silicate $Ca_3SiO_5$, can also be written as $3CaO.SiO_2$. It is intended that this does not mean that the oxides have an existence in the structure on their own.

The formulae of the oxides commonly found in the field of hydraulic binders are also abbreviated with a single letter, as follows:
  C represents CaO,
  A represents $Al_2O_3$,
  F represents $Fe_2O_3$,
  S represents $SiO_2$,
  $ represents $SO_3$,
  N represents $Na_2O$,
  K represents $K_2O$, and
  M represents MgO.

The clinker according to the present invention is a belite clinker, and not a belite sulpho-aluminous clinker. Indeed, the belite clinker according to the present invention does not comprise a ye'elimite phase C4A3$.

Conversely, sulpho-aluminous clinkers, which cover a wide range of compositions, have as a common point the presence of a ye'elimite phase (C4A3$). A list of different types of sulpho-aluminous clinkers has been set forth by Odler (Odler 2000) and is repeated hereinafter:
  alite base sulpho-aluminous clinker, which is characterised by the simultaneous presence of ye'elimite and alite, but without belite;
  ye'elimite modified Portland clinker, which is manufactured by mixing 5 to 20% of separately produced ye'elimite with a Portland clinker;
  clinker without calcium silicate, which mainly comprises a mixture of ye'elimite and calcium sulphosilicate (C5S2$) (and anhydrite to obtain cement). The mechanical strength of this clinker is very quickly developed but is not improved on the long term;
  belite sulpho-aluminous clinker, including ye'elimite and belite as the main components. It does not comprise alite and very few tricalcium aluminate. An example of belite sulpho-aluminous clinker comprises belite (40 to 75%), calcium sulpho-aluminate (15 to 35%) and ferrite (5 to 25%). The hydration of this clinker type generally occurs in two phases: first hydration of the calcium sulpho-aluminate phase, to form ettringite and AH3, then hydration of belite and ferrite, with transiently formation of stratlingite C2ASH8, and then formation of C—S—H (Calcium Silicates Hydrates). Between both these phases, there is a dormancy period which generally ranges from a few hours to a few days.

The hydration of the belite clinker according to the present invention results in a limited ettringite formation (hydration of the ferrite phase) and then in a significant C—S—H formation from belite.

In the clinker according to the present invention: the amount of belite is preferably from 80 to 95%; and/or the amount of calcium alumino-ferrite is preferably from 5 to 20%.

Belite of the clinker according to the present invention has a particle size such that Dv50 ranges from 5 to 15 µm.

Belite of the clinker according to the present invention can be in the $\alpha$, $\alpha'$, $\beta$ form or mixtures thereof. In particular, the $\alpha'$ belite can be $\alpha'_H$ or $\alpha'_L$, in particular as a function of the level of substitution elements and the cooling rate of the clinker.

Pure belite has the general formula $2(CaO).(SiO_2)$, (i.e. C2S); calcium alumino-ferrite is not a stœchiometric compound but a solid solution $Ca_2(Al,Fe)_2O_5$ which general extends from C2F ($Ca_2Fe_2O_5$) to C6A2F ($Ca_2(Fe_{0.33}Al_{0.67})_2O_5$); pure alite has the general formula $3(CaO)(SiO_2)$, (i.e.: C3S); pure calcium sulpho-aluminate has the general formula $4(CaO).3(Al_2O_3).(SO_3)$, (i.e. C4A3$). Belite, calcium alumino-ferrite, alite, calcium sulpho-aluminate, and the other additional phases of the general formulae given above or below can also comprise substitution elements. Under industrial conditions, the phases are indeed rarely pure. The substitution elements are called secondary elements in the following of the description and in the claims.

Preferably, ferrite of the clinker according to the present invention is a solid solution of the formula C6F2A ($Ca_2(Fe_{0.67}Al_{0.33})_2O_5$).

Preferably, the clinker according to the present invention comprises less than 2% of alite phase, more preferentially it does not comprise an alite phase.

Preferably, the clinker according to the present invention comprises less than 2% of calcium sulpho-aluminate phase, more preferentially, it does not comprise a calcium sulpho-aluminate phase.

The clinker according to the present invention contains minor phases comprising, for example, a calcium sulphate (less than 1%), calcium langbeinite (less than 5%), perovskite (less than 1%), gehlenite (less than 1%), free lime (less than 3%), periclase (MgO) (less than 5%), ternesite (less than 3%), mayenite (C12A7 or C12A7C12) (less than 3%), C2AS (less than 1%), ellestadite ($Ca_5(SiO_4,SO_4)_3(F,OH,Cl)$) (less than 3%) and CA (less than 3%), C3A (less than 5%) and/or a vitreous phase (less than 5%).

Additionally, alkaline salts can form minor phases with chlorides: halite (NaCl) (less than 1%), sylvite (KCl) (less than 1%), $CaCl_2$ (less than 1%).

Each phase set out in the clinker according to the present invention is crystalline (except for the vitreous phase) and has its own X-ray diffraction spectrum. The amount of the phases in the clinker is generally determined by X-ray diffraction. The vitreous phase is not crystalline and thus has not a characteristic X-ray diffraction profile. The amount of vitreous phase is generally determined from the full X-ray diffraction spectrum of the clinker.

Preferably, the clinker according to the present invention comprises less than 5 mass % of water-soluble alkaline salts.

The alkaline salts present in the clinker according to the present invention can be sodium, potassium, or mixtures thereof.

Preferably, the clinker according to the present invention comprises from 0 to 5%, more preferentially from 0.01 to 2%, further preferentially from 0.02 to 1.5%, for example 0.02 to 1% of sodium expressed as sodium oxide equivalent.

Preferably, the clinker according to the present invention comprises from 0 to 5%, more preferentially from 0.1 to 2%, further preferentially from 0.2 to 1.5%, for example from 0.2 to 1% of potassium expressed as potassium oxide equivalent.

The most widely used counter-ion is sulphate. In this case, the clinker according to the present invention comprises at least 1.5% of $SO_3$, preferably from 1.5 to 5%, for example 3%, in mass with respect to the total clinker.

The alkaline salts can form compounds, for example with sulphate and/or calcium, and be for example in the following forms: arcanite ($K_2SO_4$), thenardite ($Na_2SO_4$), aphthitalite ($K_4Na_2(SO_4)_3$), calcium langbeinite ($K_2Ca_2(SO_4)_3$).

The clinker according to the present invention can comprise, for example in phases (i) to (iii) and in the other phases, one or more of the secondary elements chosen from, for example, titanium, manganese, strontium, zirconium and phosphorus. In the particular case where alternative fuels are used for preparing the clinker, chlorine and/or fluorine can also be present as secondary elements in phases (i) to (iii).

In the belite clinker according to the present invention, the secondary elements are, independently of each other, generally and preferably present in the following amounts:

from 0 to 7%, preferably from 0 to 5%, more preferentially from 0 to 2% of phosphorus expressed as phosphorus pentoxide equivalent;

less than 1%, preferably less than 0.3 mass % of chlorine with respect to the total mass of clinker;

less than 1%, preferably less than 0.3 mass % of fluorine with respect to the total mass of clinker.

The belite clinker according to the present invention is advantageously prepared according to a process which comprises the following steps of:

decarbonating a raw mix having a particle size such that the maximum diameter is lower than 100 µm;

clinkering the decarbonated raw mix for 5 to 30 minutes at a temperature ranging from 1150 to 1400° C. of calcium, silicon, alumina, magnesium, iron sources and capable, by clinkering, of providing the belite phase and the calcium alumina-ferrite phase, in the proportions as defined above; and cooling by quenching the clinker obtained.

Decarbonating the raw mix can for example be performed for 30 minutes to 1h30, for example for 1 hour at a temperature between 850 to 1 050° C., preferably from 950 to 1 000° C., for example 975° C.

Preferably, the temperature rise between decarbonating and clinkering is performed at a rise of 100 to 600° C./h, more preferentially from 200 to 500° C./h, for example of 450° C./h. Without wishing to be bound by theory, it would seem that the quicker the temperature rise, the earlier is the starting of the belite hydration. For example, it seems to be possible to gain 1.5 day for starting the belite hydration between a temperature rise of 300° C./h and a temperature rise of 450° C./h.

By clinkering, it is meant for the purpose of the present invention, the reaction, which occurs at temperatures from 1 150 to 1 400° C., between the chemical elements present which leads to the formation of the phases of the belite clinker according to the present invention. It is to be noted that if a liquid phase is formed during clinkering, then mineral phases (for example C4AF) can be formed, not during clinkering, but during cooling.

Clinkering can be performed in any suitable equipment known to those skilled in the art, for example a conventional cement kiln (for example a rotary kiln), another kiln type (for example a multi-passage kiln) or a fluidised bed. The use of a fluidised bed would have in particular the advantages to make clinkering quicker and more homogenous, to be able to perform a clinkering in the absence of a liquid phase and to be able to decrease the temperature down to about 1 000 to 1 100° C.

Clinkering takes place for 5 to 30 minutes, preferably for 5 to 15 minutes, more preferentially for 10 minutes. By way of comparison, the clinkering of a Portland clinker lasts about 45 minutes.

The clinkering temperature is between 1 150 and 1 400° C., preferably between 1 250 and 1 350° C., for example 1 350° C. Without wishing to be bound by theory, it would seem that below 1 150° C., there are too many minor phases, and above 1 400° C., there is too much liquid phase. By way of comparison, the clinkering temperature of a Portland clinker is about 1 450° C.

Without wishing to be bound by theory, it would seem that, for a same finesse of the raw mix, the clinkering duration and temperature levers have an interaction and change together over time. It seems possible thereby, for a same finesse of the raw mix, to find an optimum for both these criteria, in order to perform clinkering under the best conditions possible. It would seem that the formation of too significant a liquid phase should be avoided in particular (that is higher than 25% with respect to the total mass of the clinker) during clinkering insofar as this liquid phase seems to grow the particle size of the clinker.

Cooling the clinker obtained is performed according to methods known to those skilled in the art, for example by air quenching. The term "quenching" generally means a quick cooling achieved by dipping a hot object into a cooler fluid.

Preferably, the raw materials that can be suitable for performing the process according to the present invention can come from quarries or result from an industrial process and comprise:

a silicon source, for example sand, clay, marl, fly ashes, coal combustion ashes, pozzolans or silica fume;

a calcium source, for example limestone, marl, fly ashes, coal combustion ashes, a slag, pozzolans and calcination residues of household refuse;

a magnesium source; and an iron source, for example an iron oxide, laterite, a steel-making slag or an iron ore.

Before decarbonating, the raw mix can be prepared by mixing raw materials. The raw materials can be mixed by contacting, comprising optionally a grinding and/or homogenising step. The raw materials can possibly be dried or calcined before decarbonating.

The raw materials can be added at the same time or sequentially. Moreover, the combustion residues can also be integrated in the kiln.

The raw mix has a maximum particle size Dmax lower than 100 µm, preferably lower than 50 µm. Without wishing to be bound by theory, it would seem that the finesse of the raw mix can have an influence on quality and mineralogy of the clinker obtained. It would seem that, generally, the greater the finesse of the particles of the raw mix, the earlier is the starting of belite hydration.

The clinker according to the present invention is generally ground in a particulate form (powder) for use as a hydraulic binder in a hydraulic composition. The invention also provides a hydraulic binder which comprises a clinker according to the present invention in a particulate form and at least 0.5 dry weight % of a calcium sulphate based activator, in mass percent relative to the total mass of phases (i) to (iii).

Preferably, le hydraulic binder according to the invention comprises from 0.5 to 10%, more preferentially from 1 to 5%, for example 3% of calcium sulphate, in mass % relative to the total mass of phases (i) to (iii).

The calcium sulphate used according to the present invention comprises gypsum (calcium sulphate dihydrate, $CaSO_4 \cdot 2H_2O$), α or β semi-hydrate ($CaSO_4 \cdot 1/2H_2O$), anhydrite (anhydrous calcium sulphate, $CaSO_4$) or a mixture thereof. Gypsum and anhydrite exist in the natural state. It is also possible to use a calcium sulphate which is a by-product of some industrial processes.

Preferably, the clinker according to the present invention comprises a setting accelerator.

Preferably, the setting accelerator is a mineral compound.

Preferably, the mineral accelerator is CSH based.

Preferably, the amount of CSH based accelerator is from 0.2 to 2%, for example of 1%, in dry mass percent relative to the total mass of phases (i) to (iii).

According to one alternative, the accelerator can be chosen from known accelerators, for example calcium salts, and in particular calcium chloride, sodium nitrate, sodium nitrite, sodium thiocyanate. Preferably, the amount of calcium salt, in particular calcium chloride, is lower than or equal to 1 mass % relative to the total mass of phases (i) to (iii).

Preferably, the hydraulic binder according to the present invention comprises a Portland clinker. Preferably, the Portland clinker is as described in the NF EN 197-1 standard of February 2001.

A Portland clinker is generally mainly composed of calcium silicates: alite (C3S: generally 50 to 65%) and belite (C2S: generally 15 to 20%), as well as tricalcium aluminate (C3A: generally 5 to 15%) and ferro-aluminate (C4AF: generally 5 to 15%).

Preferably, the hydraulic binder according to the invention comprises from 0.1 to 70%, more preferentially from 0.1 to 50%, even more preferentially from 0.1 to 30% of mineral additions, mass % relative to the total mass of the hydraulic binder. It is intended that the mineral additions are used as a clinker substitute.

The mineral additions comprise, for example, blast-furnace slags (for example as defined in the NF EN 197-1 standard of February 2001, paragraph 5.2.2), pozzolans (for example as defined in the NF EN 197-1 standard of February 2001, paragraph 5.2.3), fly ashes (for example as defined in the NF EN 197-1 standard of February 2001, paragraph 5.2.4), calcined schists (for example as defined in the NF EN 197-1 standard of February 2001, paragraph 5.2.5), calcium carbonate based materials, for example limestone (for example as defined in the NF EN 197-1 standard of February 2001, paragraph 5.2.6), silica fumes (for example as defined in the NF EN 197-1 standard of February 2001, paragraph 5.2.7), metakaolins, biomass ashes (for example rice hull ashes) or mixtures thereof.

According to one alternative, the addition of calcium carbonate based materials enables compression strength to be improved 28 days after mixing, as is demonstrated in the examples hereinafter. Preferably, the mineral addition is a calcium carbonate based material.

Adding the mineral addition can be made for example by co-grinding.

It is intended that replacing part of the clinker by a mineral addition enables carbon dioxide emissions (produced upon manufacturing the clinker) to be reduced by decreasing the clinker amount.

The present invention also relates to a process for preparing a hydraulic binder according to the present invention, which comprises a step of grinding the clinker according to the present invention and a step of adding calcium sulphate, preferably by co-grinding with the clinker.

Preferably, grinding is performed in the presence of a grinding agent.

Preferably, the hydraulic binder according to the present invention comprises a grinding agent. Said grinding agent can be conventionally used at the time of the clinker grinding, or even as an adjuvant at the time of the hydraulic binder manufacture.

The grinding agent seems to improve performance, in particular compression mechanical strengths, beyond 1 day. Without wishing to be bound by theory, it would seem that grinding agents, for example triethanolamine (TEA), accelerate dissolution of phase C4AF.

The present invention also provides a hydraulic composition which comprises a hydraulic binder according to the present invention and water. The hydraulic compositions comprise the compositions in the fresh state and in the hardened state, for example a cement slurry, a mortar or a concrete.

Hydraulic compositions generally comprise a granulate. The granulates used in the compositions according to the invention comprise sand (the particles of which have generally a maximum size (Dmax) lower than or equal to 4 mm), and gravels (the particles of which have generally a minimum size (Dmin) higher than 4 mm and preferably a Dmax lower than or equal to 20 mm).

The granulates comprise limestone, siliceous and sand-lime materials. They include natural, artificial materials, waste and recycled materials. The granulates can also comprise, for example, wood.

Preferably, the hydraulic compositions according to the invention comprise an adjuvant, for example an air-entraining agent, a viscosifier, a retarder, a clay inerting agent, a plasticiser and/or a superplasticiser. The adjuvants comprise, for example those described in the standards EN 934-2 of September 2002, EN 934-3 of November 2009 or EN 934-4 of August 2009.

The clay inerting agents are compounds which enable adverse effects of the clays on the properties of the hydraulic binders to be reduced or prevented. The clay inerting agents include those described in WO 2006/032785 and WO 2006/032786.

The amount of superplasticiser, preferably of polycarboxylic superplasticiser is generally from 0.05 to 1.5%, preferably from 0.1 to 0.8%.

The term "superplasticiser" as used in the present description and in the accompanying claims is to be understood as including both water reducers and superplasticisers as described in the book entitled "*Concrete Admixtures Handbook, Properties Science and Technology*", V. S. Ramachandran, Noyes Publications, 1984.

A water reducer is defined as an adjuvant which typically reduces by 10 to 15% the amount of mixing water of a concrete for a given workability. Water reducers include, for example, lignosulphates, hydroxycarboxylic acids, carbohydrates and other specialised organic compounds, for example, glycerol, polyvinyl alcohol, sodium aluminomethyl-siliconate, sulphanilic acid and casein.

Superplasticisers belong to a new class of water reducers, chemically different from usual water reducers and capable of reducing water amounts by about 30%. Superplasticisers have been classified generally into four groups: sulphonated naphthalene formaldehyde (SNF) condensates, for example a polynaphthalene sulphonate (generally a sodium salt); sulphonated melamine formaldehyde (SMF) condensates; modified lignosulphates (MLS); and others. More recent superplasticisers include polycarboxylic compounds such as polycarboxylates, for example polyacrylates. A superplasticiser is preferably a new generation superplasticiser, for example a copolymer containing a polyethylene glycol as a grafted chain and carboxylic functions in the main chain such as a polycarboxylic ether. Sodium polycarboxylates-polysulphonates and sodium polyacrylates can also be used. Phosphonic acid derivatives can also be used. The necessary amount of superplasticiser generally depends on the cement reactivity. The lower the reactivity, the lower is the necessary amount of superplasticiser. To reduce the total amount of alkaline salts, the superplasticiser can be used as a calcium salt rather than as a sodium salt.

The water/binder (W/B) ratio in the hydraulic compositions according to the present invention is generally from 0.25 to 1.2, preferably from 0.3 to 0.8. According to one alternative, in the presence of a superplasticiser, W/B can be decreased up to values much lower than those possible with a Portland type cement. That can in particular be of interest for ultra-high performance concrete applications.

Mixing can be carried out, for example, according to known methods.

According to one embodiment of the invention, the hydraulic binder is prepared during a first step, and the possible granulates and water are added during a second step.

The present invention also relates to a process for preparing a hydraulic composition according to the present invention, comprising a step of mixing water and a hydraulic binder according to the present invention.

The hydraulic composition according to the present invention can be shaped to produce, after hydration and hardening, a shaped object, for example, for the construction field. The invention also relates to such a shaped object, which comprises a clinker according to the present invention or a hydraulic binder according to the present invention or a hydraulic composition according to the present invention which is shaped. The shaped objects for the construction field include, for example, a floor, a screed, a foundation, a wall, a partition, a ceiling, a beam, a work top, a pier, a bridge pier, a concrete bloc, a pipe, a pole, stairs, a panel, a cornice, a mould, a road element (for example a road kerb), a roof tile, a surfacing (for roads or walls), a plaster board, or an insulating (acoustic and/or thermal) element.

The hydraulic composition according to the present invention has, in particular, a low hydration heat. Indeed, the theoretical hydration heat of a hydraulic composition according to the present invention, for 100% of hydration, is about 280 J/g. The hydration heat measured is about 220 J/g. These values are to be compared with the hydration heat of a Portland cement based hydraulic composition which is about 450 J/g. This advantage enables for example this hydraulic composition to be used for making massive workings, slabs without cracks, or even oil wells.

Because of its ready rheology and slow hydration, the binder according to the present invention is a serious candidate for applications such as a drilling cement.

The manufacture of concrete massive pieces would be more readily possible without requiring particular cautions in order to limit warm-up.

With its low water demand and its potentially high strengths, the belite cement according to the invention can assist in compounding very high performance concretes.

By associating Portland clinker and the belite clinker according to the present invention, a new manufacture schedule can be created, by maximising quarry resources.

Without wishing to be bound by theory, it would seem that the reactivity of the belite clinker according to the present invention increases with an increasing temperature, without significant impact on rheology, even in the absence of adjuvants. This property could find a real interest in hot countries, in which room temperature can easily reach 40° C., or even more.

In the present description, and in the accompanying claims, the percentages are expressed in mass, unless otherwise specified.

The percentages of the phases are determined by known methods, for example by X-ray diffraction using a Rietveld analysis. The quantitative analysis of a clinker is made by a Rietveld analysis of the spectrum obtained by X-ray diffraction of this clinker. The clinker sample to be analysed is finely ground to provide a sample all the particles of which pass through a sieve the meshes of which are of a 63 µm size. The reference X-ray diffraction spectra of the crystalline phases present in the sample to be analysed (except for the vitreous phase which has no well-defined spectrum) are obtained from pure samples of these phases. To quantify each crystalline phase and the vitreous phase, an X-ray diffraction spectrum of a crystalline phase not present in the sample to be analysed is used as a reference. Suitable reference materials include rutile, quartz and corundum. The percentage of each crystalline phase and the vitreous phase in a clinker sample is then calculated from the X-ray diffraction spectrum of the sample using the Rietveld analysis, the reference spectra of each pure phase and the spectrum of the reference material which is generally rutile. The calculation method described in European patent No. 1260812 can be used. As the strength of an X-ray source in an X-ray diffractometer can decrease over time, it is desirable to measure diffraction spectra of the reference material and of the pure crystalline phases when the spectrum of the sample to be analysed is measured.

Measurement of the amount of the chemical elements present in the clinker according to the present invention is generally carried out using X-fluorescence spectroscopy. The results are normally expressed as oxide of each element.

The Dv50 is the $50^{th}$ percentile of particle size distribution by volume, that is 50% of the particles have a size lower than or equal to Dv50 and 50% of the particles have a size higher than Dv50.

In the present description, including the accompanying claims:
- the percentages, unless otherwise indicated, are by mass;
- the specific surface areas of the materials are measured by:
  - the BET method using a SA 3100 Beckman Coulter apparatus with nitrogen as an adsorbed gas; or
  - the Blaine method at 20° C. with a relative humidity not exceeding 65% using a Euromatest Sintco Blaine apparatus in accordance with the European standard EN 196-6.

Before measuring the specific surface area, humid samples are dried in an oven until a constant mass is obtained at a temperature of 50 to 150° C. (the dried product is then ground to obtain a powder the maximum particle size of which is lower than or equal to 80 µm).

The following non-restrictive examples illustrate exemplary embodiments of the invention.

EXAMPLES

Raw Materials

The raw materials used for making the different raw mixes, hydraulic binders and hydraulic compositions are described in Table 1 hereinafter.

TABLE 1

| Product | $SiO_2$ [%] | $Al_2O_3$ [%] | $Fe_2O_3$ [%] | CaO [%] | MgO [%] | $K_2O$ [%] | $Na_2O$ [%] | $SO_3$ [%] | LOI* [%] | Finess Dv50 (µm) |
|---|---|---|---|---|---|---|---|---|---|---|
| Limestone | 0.05 | 0.07 | 0.00 | 55.9 | 0.2 | 0.00 | 0.00 | 0.0 | 43.2 | 2.2 |
| Metakaolin | 55.2 | 40.9 | 0.9 | 0.3 | 0.3 | 0.96 | 0.0 | 0.0 | 0.8 | 7.7 |
| Alumina (Prolabo) | 7.5 | 79.1 | 1.9 | 3.5 | 0.0 | 0.0 | 0.0 | 0.0 | 3.0 | |
| Silica | 98.7 | 0.2 | 0.0 | 0.0 | 0.0 | 0.0 | 0.07 | 0.0 | 0.2 | 3.0 |
| Iron Oxide | 0.2 | 0.1 | 96.4 | 0.0 | 0.06 | 0.0 | 0.0 | 0.2 | 3.0 | |
| Ca-Sulphate (anhydrite MCC 224 - Poland) | 0.4 | 0.0 | 0.0 | 41.1 | 0.2 | 0.0 | 0.11 | 55.7 | 2.5 | |
| $MgCO_3$ (magnesia; Sigma Aldrich) | 0.0 | 0.0 | 0.0 | 0.0 | 47.8 | 0.0 | 0.0 | 0.0 | 52.2 | |
| $K_2CO_3$ | 0.0 | 0.0 | 0.0 | 0.0 | 0.0 | 68.2 | 0.0 | 0.0 | 31.8 | |
| $Na_2CO_3$ | 0.0 | 0.0 | 0.0 | 0.0 | 0.0 | 0.0 | 58.5 | 0.0 | 41.5 | |
| Silica (Sibelco - C600) | 98.5 | 0.83 | 0.07 | 0.04 | 0.0 | 0.0 | 0.0 | 0.0 | 0.0 | 3.0 |
| Calcium carbonate (Omya - | 0.0 | 0.06 | 0.02 | 55.8 | 0.0 | 0.0 | 0.0 | 0.0 | 43.5 | 2.2 |

TABLE 1-continued

| Product | SiO$_2$ [%] | Al$_2$O$_3$ [%] | Fe$_2$O$_3$ [%] | CaO [%] | MgO [%] | K$_2$O [%] | Na$_2$O [%] | SO$_3$ [%] | LOI* [%] | Finess Dv50 (μm) |
|---|---|---|---|---|---|---|---|---|---|---|
| Durcal1) | | | | | | | | | | |
| Iron ore (Prolabo) | 2.0 | 0.0 | 96.0 | 0.0 | 0.0 | 0.0 | 0.0 | 0.0 | 1.2 | |
| Gypsum (Meriol) | 0.7 | 0.0 | 0.0 | 32.7 | 0.0 | 0.0 | 0.0 | 44.5 | 21.7 | |
| CEM I from Port La Nouvelle | 20.1 | 4.9 | 2.8 | 63.9 | 1.4 | 0.8 | 0.1 | 3.2 | 2.0 | |

*LOI: Loss on ignition

In table 1 hereinabove, the total is not always 100% in particular because of minor elements which are non taken into account.

The grinding agent used was TEA (triethanolamine C$_6$H$_{15}$NO$_3$) having a 95% purity, the provider of which is VWR.

Preparation of the CSHs

The accelerator suspension (CSH) was prepared from CEM I cement from Port La Nouvelle suspended in demineralised water. The water/cement ratio was set to 7.5. To this suspension, a PCP type superplasticiser was added at 10% by wet mass (of solution) relative to the cement mass. The superplasticiser used was Glenium ACE 456 (Provider: BASF), which is in the solution form. To this suspension, a viscosifier was been added at 1% by dry mass (of powder) relative to the superplasticiser mass. The viscosifier used was Aquabeton (Provider: Chryso), which is in the powder form. Both adjuvants were added at the start of the synthesis. The suspension was stirred at 450 rpm for 2 days in a glass reactor at a temperature of 20° C. The composition of the formulation used is set out in table 2 hereinafter.

TABLE 2

Formulation of the accelerator suspension

| Composition | Port la Nouvelle CEM I 52.5 R | Glenium ACE 456 (BASF) | Aquabeton (Chryso) | water |
|---|---|---|---|---|
| mass | 200 g | 20 g of solution | 0.2 g of powder | 1.5 L |

After the synthesis, the accelerator suspension was preserved in a polypropylene sealed container. The accelerator suspension required a minimum maturation time (rest time after stirring) to reach the maximum performance. This maturation time was between 7 and 14 days.

The accelerator suspension thus obtained had a BET specific surface area of about 50 to 80 m$^2$/g after drying at 60° C. until it had a constant mass.

Production of Two-Phase Belite Clinker

Preparation of the Raw Mix

A jar rotating machine generally enables a powder mixture to be homogenised in a wet medium, using alumina beads. For an optimum mixing, the powders to be homogenised should generally have a particle size lower than 200 μm.

The raw materials were mixed in the amounts set out in table 3 hereinafter.

TABLE 3

Weighings for 5 Kg of material with the raw materials

| Mass (Kg) | Limestone | Silica | Magnesia | Alumina | Iron ore | Anhydrite |
|---|---|---|---|---|---|---|
| BI3 | 3.541 | 0.888 | 0.020 | 0.065 | 0.304 | 0.182 |

The addition of water was carried out with demineralised water. The mixing of powders and demineralised water (1:1 mass mixture) was carried out beforehand in the jar.

In the jar, alumina beads with three different diameters (17, 25 and 35 mm) were added. The total volume of the beads account for 50 to 60% of the internal volume of the jar.

The beads with different sizes were distributed according to the following proportions (mass %): 25% small ones (17 mm), 50% medium ones (25 mm) and 25% large ones (35 mm). Then, after properly closing the jar by making sure of the presence of a seal, the jar was installed on rolls.

The jar rotation time was about 2h30 for 2 kg of material and 2 kg of water. The rotation speed of the jar was 50 to 80% of the critical speed, that is the speed at which the beads are satellised because of the centrifugal force. At the end of homogenisation, the beads were recovered using a sieve and the mixture were poured in an appropriate container.

The mixture was then dried in an oven at 105° C. for at least one night. This step generally does not last more than 24 hours. The end of drying is generally determined by a visual monitoring. This step is generally not made in a factory, because the process is continuous and the decarbonating step is made immediately after. This step is generally useful in a laboratory because some species are water soluble and will be lost without the intermediate drying.

Production of Granulates

The granulates were produced thanks to a pan granulator.

After turning ON the granulator and putting the scraper half-way up to avoid that the powder turns around the granulator, the powder was intermittently sprayed to form granulates. The water addition frequency was set according to a practice known to those skilled in the art, depending on the formation quality of the granulates, with a visual monitoring. The amount of added water is generally such that the humidity of the granulates is between 10 and 20%, for example 15%.

For the purpose of forming small granulates, according to a practice known to those skilled in the art, the scraper was placed on top of the granulator (above half-height up). When the granulates were formed, the granulator continued to rotate for about 10 minutes to obtain solid granulates, in the absence of addition of water. Then, the granulator was stopped and the granulates were sieved in order to keep only granulates with a diameter higher than 3 mm and lower than 10 mm.

The granulates thus obtained were placed in a ventilated oven at 110° C. for drying up to a constant mass.

Baking

The raw materials prepared as granulates (called a raw mix) were introduced in platinum crucibles in a static furnace.

The temperature profile (temperatures and residence time) enabled the raw mix to be baked in 2 successive phases: a decarbonating phase and a higher temperature clinkering phase.

In a known manner, the limestone decarbonation phase was performed with a temperature rise of 1 000° C./h until 975° C., followed by a holding period of one hour at this temperature (975° C.).

The clinkering phase was performed with a temperature rise of 300° C./h up to 1 330° C., which temperature was preserved for 15 minutes.

In order to fix the mineralogical phases of the clinker, the sample has undergone a quenching at room temperature on a metal plate at the end of the clinkering.

After clinkering, X-ray diffraction Rietveld analyses have shown that the mineralogical composition of the clinker obtained is close to the 80% C2S and 20% C4AF target. The results are reported in table 4 hereinafter.

TABLE 4

| | Mineralogical composition | | |
|---|---|---|---|
| | C2S | C4AF | Anhydrite |
| BI3 | 82.0% | 16.6% | 1.4% |

Production of a Binder According to the Present Invention
Test with and without Gypsum The effect of the sulphate content of the cement on the hydration rate and the acquisition speed of the mechanical strengths was tested on a composition comprising the clinker BI3 and having a ratio W/B of 0.4.

The clinker BI3 was ground at a 5 256 cm²/g Blaine specific surface area.

The hydration start time was calculated from the microcalorimetry curve, as described hereinafter.

The isothermal microcalorimetry is one of the basic methods used for following the hydration.

The Tam Air calorimeter is mainly used to measure heat fluxes due to the fact that chemical reactions immediately follow each other during the hydration process.

The measurements were carried out at 20° C.

The preparation of the sample was made by external hand mixing, of a quantity of about 30 g of clinker.

A mass of 5 to 10 g was introduced in the calorimetry cell.

The measurement of the thermal flux was followed for 14 days.

Two events were noticed:
a first set of exothermal peaks starting within the first 24 hours;
a second exothermal peak triggering later and spreading over several days, associated with the CSH formation and belite dissolution.

The appearance time of the second peak is associated, for the belite cements according to the present invention, with the belite hydration start and the CSH and Portlandite formation.

Several formulae were tested: a control without sulphate, only comprising the clinker and water, and three formulations according to the present invention comprising clinker, water and respectively 3, 5 and 8 mass % of gypsum relative to the mass of clinker. The gypsum was a sulphate source.

The results of the microcalorimetry measurements show that, relative to the control without sulphate, an addition of sulphate (gypsum) causes a time offset of the C2S hydration peak. Indeed, the addition of sulphate causes a C2S hydration start at about 7 days (instead of about 16 days in the absence of added sulphate).

Measurements of the mechanical strengths, made according to the standard EN 196-1 15 days after mixing confirmed these observations. Indeed, the compression mechanical strengths obtained 15 days after mixing the control non-gypsed clinker were about 4 MPa, whereas for the hydraulic compositions according to the present invention comprising from 3 to 8 mass % gypsum, the compression mechanical strengths obtained were in the order of 50 MPa at the same end.

Amount of Gypsum with Bounds

Five different gypsum addition contents were tested: 0.5; 1.5; 3; 5 and 8 mass % of gypsum relative to the clinker mass, on a composition comprising the ground BI3 clinker at a Blaine specific surface area of 5 200 cm²/g and having a W/B ratio of 0.4.

Microcalorimetry measurements were performed according to the protocol described hereinabove, in order to compare the C2S hydration start times.

As soon as 0.5% of gypsum was added, a decrease in the C2S hydration start time was noticed (16 days for the control without added gypsum and 12 days for the composition comprising 0.5% of gypsum). The decreasing C2S hydration start time was observed up to a gypsum addition of 1.5%. From this percentage, a 6.5 days holding period was noticed up to a gypsum content of 8%.

Effect of Temperature

In order to determine the effect of temperature on C2S hydration, compression strengths were measured on the same composition at 40° C. and at 80° C. The tested composition comprised clinker BI3, 5 mass % gypsum relative to the clinker and had a W/B ratio of 0.4.

The mechanical strengths were measured according to the protocol described hereinafter.

A mass of 30 g of clinker was mixed, and then introduced into cylinders of 11.5 mm diameter and 50 mm height using a syringe paying attention not to trap air bubbles.

These cylinders were dipped in water at 40 or 80° C. Once set, they were demoulded and then preserved by dipping in water at 40 or 80° C. After sawing the sample at its ends to obtain two parallel faces, a press was used to measure the compression strength.

Table 5 hereinafter gives the results obtained.

TABLE 5

| (Mpa) | W/B = 0.4 - 40° C. | W/B = 0.4 - 80° C. |
|---|---|---|
| 1 d | 2 | 37 |
| 6 d | 46 | 49 |
| 13 d | 50 | 50 |

A beneficial effect of an increase in temperature was noticed on the mechanical strengths 1 day after mixing.

Effect of a CSH or $CaCl_2$ Based Accelerator

From a hydraulic binder comprising clinker BI3, 5 mass % of gypsum relative to the clinker and having a ratio W/B of 0.4, different mineral accelerators were tested: 1% dry mass (of powder) of $CaCl_2$ and 3% liquid mass of CSH.

The CSH based accelerator, which was that previously manufactured, was in the form of a solution and was added to the mixing water. The CSH solution had a solid content of 15.5%. About 0.5% of dry content was thus added relative to the gypsed clinker.

The $CaCl_2$ based accelerator was in the form of a powder (Provider: VWR).

Microcalorimetry measurements enabled the C2S hydration start times to be compared. The C2S hydration start was in the order of 6.5 days without CSH and without $CaCl_2$, 5 days with $CaCl_2$ and 2.5 days with 0.5% of CSH.

The positive impact of the presence of mineral accelerators was thus demonstrated.

Effect of TEA and Calcium Carbonate

TABLE 6

Proportions of the raw mix

| Raw materials | Mass % |
| --- | --- |
| Limestone | 71.1 |
| Metakaolin | 6.0 |
| Silica | 14.2 |
| Iron oxide | 3.8 |
| Calcium sulphate | 3.7 |
| $MgCO_3$ | 0.5 |
| $Na_2CO_3$ | 0.2 |
| $K_2CO_3$ | 0.5 |

The raw mix, the composition of which is summarised in table 6 hereinabove, was prepared by wet homogenising using a jar rotating machine for 2 hours.

The homogeneous raw mix was then distributed in plates and it was put in the oven overnight at 110° C. to evaporate water.

Granulates were then formed from this raw mix using a pan granulator and water.

These granulates were dried for 12 hours in an oven at 110° C.

Baking the Clinker

Bakings were made in a laboratory muffle furnace. The granulates were placed in platinum crucibles and treated according to the following protocol:
  introducing 6 crucibles into the furnace, without lid;
  temperature rise No 1: 1 000° C./h up to 975° C.;
  isothermal holding period at 975° C. for 1 h;
  placing the lids on the crucibles;
  temperature rise No 2: 500° C./h up to the temperature of 1 350° C.;
  isothermal holding period at 1 350° C. for 10 minutes;
  emptying the crucibles and room temperature quenching in steel tanks.

The mineralogy of the clinker obtained was analysed by X-ray diffraction and the result is reproduced in table 7 hereinafter.

TABLE 7

Mineralogical composition of the clinker (mass %)

| Alite C3S | Belite C2S | Ferrite C4AF | Alumina C3A | Ca Langbeinite |
| --- | --- | --- | --- | --- |
| 0 | 85 | 14 | 0 | 1 |

Preparation of the Binder

The clinker was ground with a ball grinder of 5 kg (loaded at 2 kg) up to a Blaine specific surface area of 4 000 $cm^2/g$, and then separated into two parts to produce two cements. Cement A was sulphated with 5 mass % of gypsum and ground at 5 230 $cm^2/g$ of Blaine specific surface area, and cement B was sulphated with 3 mass % of gypsum, added with 5 mass % of fine calcium carbonate and ground at 5 793 $cm^2/g$ of Blaine specific surface area.

Strength Tests According to Standard EN 196-1

Mortars under normalised conditions were prepared with cements A and B in order to determine compression strengths. In addition, mortars were made by adding TEA as an adjuvant in the mixing water (and not as a grounding agent), in order to determine its influence on the final strengths. The results of the compression mechanical strength tests according to standard EN 196-1 are shown in table 8 hereinafter:

Tableau 8
Compression strengths in normalised mortar EN

| Cement | Compression strength 2 days [MPa] | Compression strength 7 days [MPa] | Compression strength 28 days [MPa] |
| --- | --- | --- | --- |
| A | 6.9 | 31.7 | 62.2 |
| A + 0.03% TEA | 6.8 | 32.4 | 69.0 |
| B | 5.9 | 28.5 | 67.9 |
| B + 0.03% TEA | 7.3 | 33.9 | 73.9 |

The results of table 8 hereinabove show the improvement in the mechanical strengths achieved by virtue of the addition of TEA in the mortar as an adjuvant, by comparing rows A to each other and rows B to each other respectively.

Additionally, the beneficial effect of calcium carbonate on the mechanical strengths is also demonstrated in the presence of TEA, or even in the absence of TEA at 28 days.

The invention claimed is:

1. A hydraulic binder which comprises
   a particulate-shaped clinker, the clinker comprising as main phases, in % expressed in mass relative to the total mass of the clinker:
      (i) from 70 to 95% of a belite phase having a particle size such that Dv50 ranges from 5 to 15 μm;
      (ii) from 5 to 30% of a calcium alumino-ferrite phase; and
      (iii) less than 5% of minor phases;
   the clinker having an $Al_2O_3/Fe_2O_3$ mass ratio lower than 1.5; and
   the clinker comprising less than 5% of alite phase and less than 5% of calcium sulpho-alminate phase
   and at least 0.5% dry mass of a calcium sulphate-based activator, in mass percent relative to the total mass of the phases (i) to (iii).

2. The hydraulic binder according to claim 1, comprising a setting accelerator.

3. The hydraulic binder according to claim 1, wherein the clinker comprises less than 5% of water-soluble alkaline salts.

4. The hydraulic binder according to claim 1, wherein the clinker is prepared by a process which comprises:
   decarbonating a raw mix having a particle size such that the maximum diameter is lower than 100 μm;
   clinkering the decarbonated raw mix for 5 to 30 minutes at a temperature ranging from 1 150 to 1 400° C. of calcium, silicon, alumina, magnesium, iron sources and capable, by clinkering, of providing the belite phase and the calcium alumino-ferrite phase, to obtain the clinker comprising as main phases, in % expressed in mass relative to the total mass of the clinker:
(i) from 70 to 95% of said belite phase;
(ii) from 5 to 30% of said calcium alumino-ferrite phase; and
(iii) less than 5% of minor phases;
the clinker having an $Al_2O_3/Fe_2O_3$ mass ratio lower than 1.5; and
the clinker comprising less than 5% of alite phase and less than 5% of calcium sulpho-alminate phase; and
cooling by quenching the clinker obtained.

5. The hydraulic binder according to claim 1, comprising a Portland clinker.

6. A process for preparing a hydraulic binder according to claim 1, which comprises a step of grinding the clinker and a step of adding calcium sulphate.

7. A hydraulic composition which comprises a hydraulic binder according to claims 1 and water.

8. A process for preparing a hydraulic composition according to claim 7, comprising a step of mixing water and the hydraulic binder.

9. A shaped object for the construction field comprising a hydraulic composition according to claim 7.

\* \* \* \* \*